United States Patent [19]
Okamoto et al.

[11] 3,818,433
[45] June 18, 1974

[54] CHECKING SYSTEM FOR VEHICLE EQUIPMENTS

[75] Inventors: Atsutoshi Okamoto, Toyohashi; Akio Sugiura, Nagoya, both of Japan

[73] Assignee: Nippondenso Co., Ltd., Kariya-shi, Aichi-ken, Japan

[22] Filed: Sept. 7, 1971

[21] Appl. No.: 178,243

[30] Foreign Application Priority Data
Sept. 25, 1970 Japan.............................. 45-84492

[52] U.S. Cl. .............. 340/53, 188/1 A, 303/21 AF, 340/410
[51] Int. Cl............................ B60q 1/00, B60t 8/08
[58] Field of Search............ 340/52 R, 53, 410, 411; 188/1 A; 303/21 AF

[56] References Cited
UNITED STATES PATENTS

| | | | |
|---|---|---|---|
| 3,516,715 | 6/1970 | Fielek, Jr. et al............... | 303/21 AF |
| 3,598,452 | 8/1971 | Clifford et al. ..................... | 340/410 |
| 3,680,923 | 8/1972 | Peterson et al. .................. | 340/52 R |

Primary Examiner—John W. Caldwell
Assistant Examiner—Glen R. Swan, III
Attorney, Agent, or Firm—Cushman, Darby & Cushman

[57] ABSTRACT

In a vehicle equipment including a signal source for representing an instant vehicle condition, an electrical circuit for producing a signal corresponding to a predetermined condition and electromagnetic means for operating a mechanical actuating means, a checking system for the vehicle equipment comprises a logic circuit for applying a check signal originated from said signal source to energize said electromagnetic means in a very short period so as not to actuate said mechanical actuating means, and a warning device operable upon receipt of said check signal.

8 Claims, 12 Drawing Figures

CHECKING SYSTEM FOR VEHICLE EQUIPMENTS

PREAMBLE

The present invention relates generally to checking systems for vehicle equipment and more particularly to a checking system for inspecting whether the various equipment installed in a vehicle, such as an electronic anti-skid control system, automatic transmission, fuel injection system and direction indicator flasher system, is in a condition for normal operation.

In the past, with automotive vehicles of the type employing, for example, an anti-skid control system designed such that when there is a tendency for the wheels to lock, a braking pressure modulator for reducing the braking pressure applied to the wheels is actuated to forcibly reduce the braking pressure thereby preventing the occurrence of skidding due to the braking of the vehicle, the following system has been employed to determine whether or not the anit-skid control system is in condition to operate normally. In other words, a check is carried out by applying a check signal to the anti-skid control system to actuate the braking pressure modulator when the vehicle is at rest.

However, with the conventional system of the type described above, each time the check is to be made the check button must be depressed to apply a check signal to the anti-skid control system and this is apparently a very annoying procedure for the driver. Thus, there is an inconvenience in that the driver may feel it too much trouble to press the check button to check whether or not the anti-skid control system is in condition for normal operation whenever he makes his morning checks and inspections or before starting the vehicle and that the driver may frequently neglect to make a check, thus causing a loss of the merit of existence of the checking system. Furthermore, the conventional system of the above-mentioned type is designed such that when the check is to be made the braking pressure modulator is actually operated to reduce the braking pressure and thus it is prohibited from making the check while the vehicle is running, since it would, of course, be dangerous to make a check whilst the vehicle is running.

This in turn gives rise to a problem in that if the anti-skid control system goes wrong and fails to operate normally while the vehicle is running, it is possible that the driver, not knowing the failure and thus still relying on the normal operation of the anti-skid control system, may apply an excessively large braking pressure to the wheel so that particularly on a slippery road surface the failure in the operation of the anti-skid control system results in the locking of the wheel under such excessively large braking pressure, thereby inducing the skidding of the vehicle body.

Therefore, in order to solve the difficulties described above and in consideration of the fact that a mechanically operated actuator, such as a braking pressure modulator has an inherent delay attended by the mechanical operation thereof, it is an object of the present invention to provide, in a vehicle including an electrical circuit for receiving a signal from a signal source to produce a signal corresponding to a predetermined condition and electromagnetic means for receiving the signal from said electrical circuit to electromagnetically operate the mechanical actuating means of said actuator, a checking system for vehicle equipments comprising a logic circuit for applying a check signal obtained by performing a wave-shaping operation on the signal from said signal source to said electrical circuit to energize said electromagnetic means and terminating said check signal by detecting the energization of said electromagnetic means, and a warning device operable upon receipt of said check signal from said logical circuit, the duration time of said check signal being shorter than the delay time attended by the operation of said mechanical actuating means and said electromagnetic means.

According to the present invention, there is a remarkable effect in that by virtue of said check signal it is possible, even while the vehicle is running, to always check by means of a warning produced by said warning device whether or not said signal source, electrical circuitry and electromagnetic means are in condition for normal operation without the operation of the mechanical actuating means, and thus, if the system of the present invention is applied to an anti-skid control system, while driving the vehicle, the driver will be able to check whether or not the anti-skid control system is in condition for normal operation without actuating the braking pressure modulator whenever he makes the check, that is, there is no need to reduce the braking pressure at each time the driver makes the check. In this way, the driver can always determine whether or not the electrical circuitry for the anti-skid control system is in good condition for normal operation from the input to the output end thereof independent of the braking system and a check on a running vehicle can be carried out in a very safe manner. Moreover, when running on a slippery road surface or running at a high speed, it is possible to apply the braking pressure with a certainty, that is, the braking pressure can be applied without anxiety as to whether or not the anti-skid control system operates normally and at the same time there is no possibility that owing to the failure of the anti-skid control system to operate properly the application of the braking pressure results in the locking of the wheels thereby causing the vehicle body to skid. There is a further useful effect in that the check operation described above can be automatically effected at all times irrespective of whether the vehicle is at rest or being driven, so that the driver is relieved of all the procedure of purposely pressing the check button as hitherto required with the conventional systems and thus the present invention is especially useful. There is a still further effect in that since the warning device adapted to be operated by the check signal, for example, gives warning intermittently when it has received the check signal and all the electrical circuitry is in the normal condition, while it either continually operates or gives no warning at all when the circuitry is at fault, the driver can easily determine according to the type of warning whether or not the circuitry is operative and particularly when the circuitry is at fault the driver can determine whether the fault is on the "fail safe" side or it is not a "fail safe" fault.

It is another object of the present invention to provide, in a vehicle including an electrical circuit for receiving a signal from a signal source to produce a signal corresponding to a predetermined condition and electromagnetic means for receiving the signal from said electrical circuitry to electromagnetically operate mechanical actuating means, a checking system for vehicle equipments comprising a logical circuit for applying a check signal obtained by performing a waveshaping operation on the signal from said signal source to said electrical circuit to energize said electromagnetic means and terminating said check signal by detecting the energization of said electromagnetic means, and a warning device designed to be actuated upon receipt of the check signal from said logic circuit, wherein said logic circuit comprises logic elements operable according to changes in the state of digital signal, and the duration time of said check signal is selected to be shorter than the delay time attended by the operation of said mechanical actuating means and said electromagnetic means.

Therefore, according to the present invention, there is a still further useful effect in that particularly owing to the fact that the logic circuit comprises logic elements adapted to be operated according to changes in the state of digital signal, each of the single function logic elements operates itself upon receipt of the output signal from the preceeding single function logic element which changes from "0" to "1" or vice versa so that the logic elements can always operate themselves while checking the operations of the preceeding logical elements and in this way not only is it possible for the system of the present invention to check whether or not the signal source, electrical circuitry and electromagnetic means are in condition for normal operation, but also it is possible for the system of the present invention to check whether or not the system itself is normally operative.

The above and other objects and advantages of the present invention will be readily apparent from the following description of a preferred embodiment of the invention taken in conjunction with the accompanying drawings, in which:

BRIEF DESCRITION OF DRAWINGS

FIG. 1 is an electrical wiring diagram showing the electric circuitry for the present invention; and FIGS. 2(a) through 2(k) illustrate the voltage waveforms at various points of the electrical circuitry shown in FIG. 1 and are useful for the explanation thereof.

DETAILED DESCRIPTION

Figure 1:
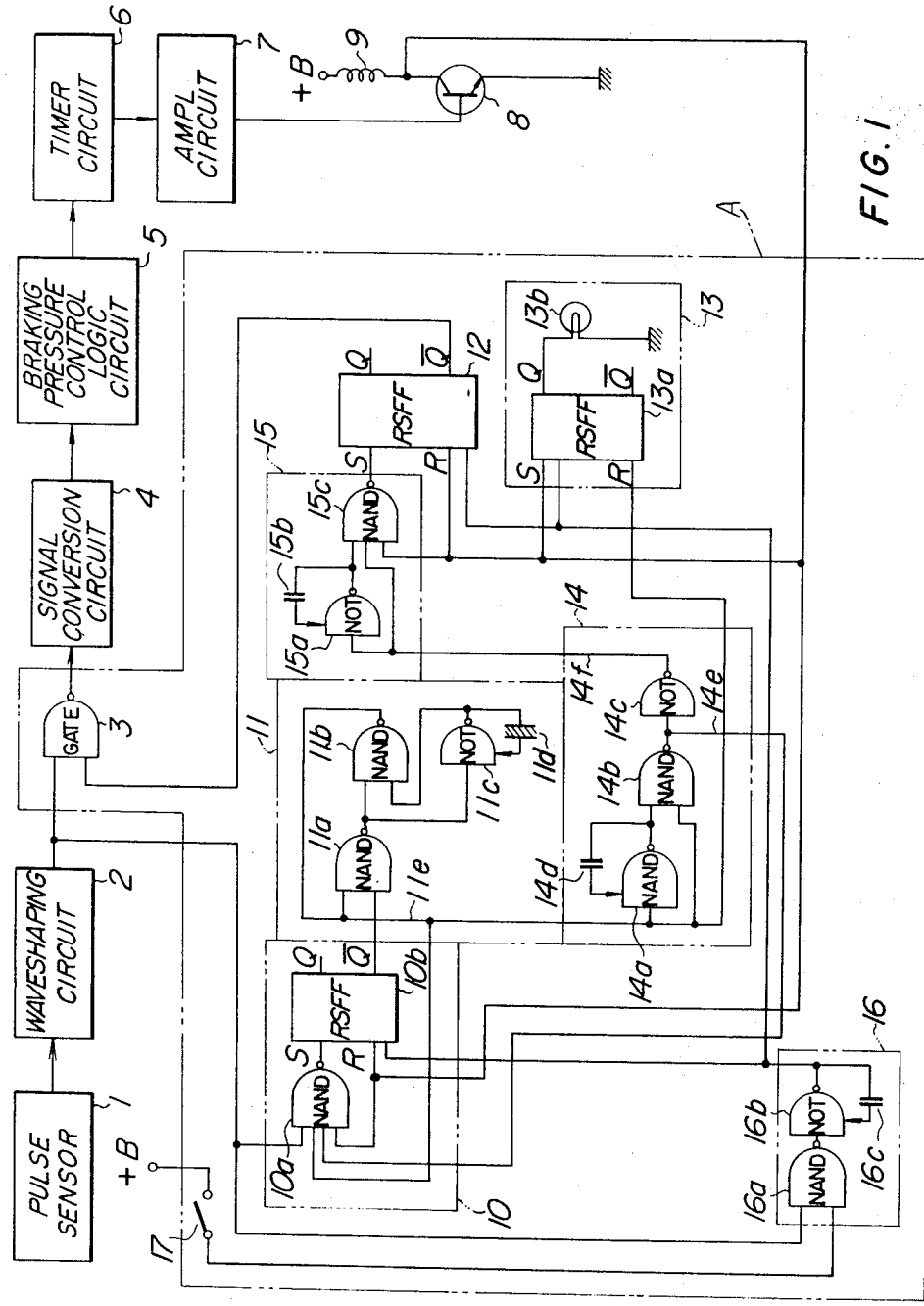
Figure 2:
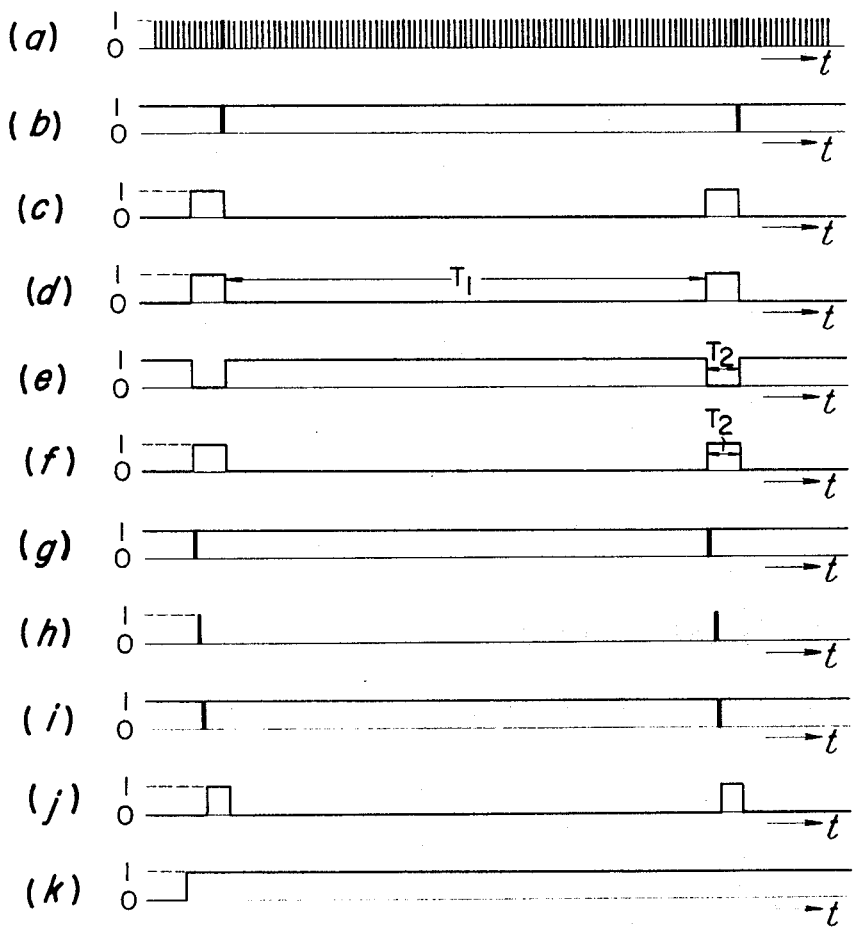

The preferred embodiment of the present invention as applied to an anti-skid control system for vehicles will now be explained. Referring first to the diagram of FIG. 1, numeral 1 designates a pulse sensor constituting a signal source for producing voltage pulses which are produced, for example, by means of a toothed wheel of a magnetic material adapted to rotate with the wheel and a coil wound on a permanent magnet disposed near the points of the teeth of the wheel so that the number of voltage pulses induced per a unit time in the coil by the rotation of the toothed wheel may be detected to determine the wheel speed. Numeral 2 designates a waveshaping circuit for amplifying the sine wave signal from the pulse sensor 1 into a square wave signal. Numeral 3 designates a gate circuit, such as a NAND circuit, which permits or holds the passage of the square wave pulse from the waveshaping circuit 2 to the succeeding stage. Numeral 4 designates a signal conversion circuit for converting the square wave pulse passed through the gate circuit 3 into a DC voltage proportional to the wheel speed and it may be a D-A converter in the case of an analog system and a counter circuit if a digital system is employed. Numeral 5 designates a braking pressure control logic circuit which determines the extent of decrease of the wheel speed according to a decrease in the output voltage from the signal conversion circuit 4 so as to decide whether or not a signal for reducing the braking pressure applied to the wheel should be generated. Numeral 6 designates a timer circuit which is a kind of fail circuit designed such that when any of the circuits preceeding the braking pressure control logic circuit 5 fails in a direction to maintain the continued releasing of the braking pressure applied to the wheel, the timer circuit 6 comes into operation so that after a predetermined lapsed time the condition is achieved in which the braking pressure can be automatically applied, that is, the condition similar to one which is obtainable when no anti-skid control system is employed. Numeral 7 designates an amplifier for amplifying the pressure reducing signal from the braking pressure control logic circuit 5 so that a current sufficient to energize an electromagnetic coil 9 of a braking pressure modulator is supplied to the base of a transistor 8. When the electromagnetic coil 9 is energized, a three-way valve and servo means, for example, will be actuated to forcibly reduce the braking pressure applied to the wheel even though the driver continues to press the brake pedal, whereas when the electromagnetic coil 9 is not energized as much braking pressure as produced by the depression of the brake pedal by the driver will be applied to the wheel. Designated as A is a logical circuit comprising a synchronization circuit 10, a monostable multivibrator (hereinafter simply referred to as an M.M.V.) 11, an RS flip-flop (hereinafter simply referred to as an RSFF) 12, a warning device 13, timer circuits 14, 15 and 16, a power source switch 17 and the gate circuit 3. The synchronization circuit 10 comprises a NAND circuit 10a and an RSFF 10b. The M.M.V. 11 comprises NAND circuits 11a and 11b, a NOT circuit 11c and a capacitor 11d and numeral 11e designates an output terminal. The output pulse of the M.M.V. 11 appearing at the output terminal 11e has a time width $T_1$ which is one second, for example, depending on the time constant which is the product of the capacitance (e.g., 50 $\mu$F) of the capacitor 11d and the internal resistances of the NAND circuits 11a and 11b and the NOT circuit 11c. The warning device 13 comprises an RSFF 13a and a lamp 13b. Numeral 14 designates a timer circuit comprising NAND circuits 14a and 14b, a NOT circuit 14c and a capacitor 14d and the circuit is connected to the output terminal 11e of the M.M.V. 11. The purpose of the timer circuit 14 is to increase the time width of the pulse signal produced at the output terminal of the RSFF 13 to a predetermined time $T_2$ which is on the order of 50 milliseconds (Exactly, it is 47 milliseconds as will be explained later), since the pulse width of the signal produced at the output terminal of the RSFF 12 has a short pulse width of the order of 3 milliseconds. This predetermined time $T_2$ of 50 milliseconds is dependent on the capacitance (e.g., 1 $\mu$F) of the capacitor 14d. With the arrangement described, the NAND circuit 10a of the synchronization circuit 10 produces as its output signal a "0" signal as shown in FIG. 2(b) when the output of the waveshaping circuit 2 shown in FIG. 2(a), the output produced at the output terminal 11e of the M.M.V. 11, FIG. 2(d), the output produced at the output terminal 14e of the timer circuit 14, FIG. 2(e), and the output produced at the collector of the transistor 8, FIG. 2(i), change to "1" simultaneously. This output signal then sets the RSFF 10b to change the signal at its output terminal $\overline{Q}$ from "1" to "0" as shown in FIG. 2(c) and the signal produced by this transition from "1" to "0" triggers the M.M.V. 11 so that the signal at the output terminal 11e of the M.M.V. 11 changes from "1" to "0" as shown in FIG. 2(d) and it returns to "1" from "0" after the lapse of the predetermined time $T_1$ as shown in FIG. 2(d). The timer circuit 14 is designed such that upon receipt of the signal produced at the output terminal 11e of the M.M.V. 11 shown in FIG. 2(d), the timer circuit 14 produces at output terminal 14e, as shown in FIG. 2(e), a "0" signal for the predetermined time $T_2$ of 50 milliseconds, for example, which is dependent on the capacitance of the capacitor 14d and at the same time a signal which is the inverted form of this "0" signal is produced at an output terminal 14f to assume the "1" state for the predetermined time $T_2$ as shown in FIG. 2(f). Numeral 15 designates a timer circuit comprising a NOT circuit 15a, a capacitor 15b and a NAND circuit 15c so that when the output signal produced at the output terminal 14f of the timer circuit 14 changes from "0" to "1," the timer circuit 15 applies to the set input terminal of the RSFF 12 a pulse shown in FIG. 2(g) having a very small pulse width of 50 microseconds, for example, and this pulse width is dependent on the capacitance (1,000 pF, for example) of the capacitor 15b. The warning device 13 is designed such that application of a set pulse to the RSFF 13a supplies a current to the lamp 13b, while application of a reset pulse to the RSFF 13a stops the supply of current to the lamp 13b. In this case, the set pulse is the signal produced at the collector of the transistor 8, and the "0" signal produced at the output terminal 11e of the M.M.V. 11 is employed as the reset pulse. Numeral 16 designates a timer circuit comprising a NAND circuit 16a, a NOT circuit 16b and a capacitor 16c. The output signal of the NOT circuit 16b assumes the "0" state as shown in FIG. 2(k) and serves to place the RSFF's 10b and 12 in the reset condition and the RSFF 13a in the set condition upon closing of a power source switch 17 of the anti-skid control system which is linked to the key switch (not shown) of the vehicle when the vehicle is at rest and the output signal of the waveshaping circuit 2 is in the "0" state. The output of NOT circuit 16b remains in the "1" state when the vehicle is being driven and the pulse signal from the waveshaping circuit 2 is on. In the drawings, symbol +B designates the power supply terminal connected to the positive terminal of the vehicle battery.

The operation of the electric circuitry shown in FIG. 1 will now be explained. When the power source switch is closed, the output signal from the timer circuit 16 will reset the RSFF's 10b and 12 and set the RSFF 13a, causing the lamp 13b to be lit. If the vehicle starts running so that the waveshaping circuit 2 produces square wave pulse signal and if then the whole circuitry is in normal condition, the output of the NOT circuit 16b in the timer circuit 16 assumes the "1" state as shown in FIG. 2(k). Then, when the output of the waveshaping circuit 2 changes to "1," the NAND circuit 10a of the synchronization circuit 10 produces a "0" signal and hence a "0" signal is produced at the output terminal $\overline{Q}$ of the RSFF 10b so that the M.M.V. 11 produces a "0" signal only for the predetermined time duration $T_1$ as shown in FIG. 2(d). This causes RSFF 13a to be reset at the beginning of time $T_1$ thereby turning off lamp 13b as shown in FIG. 2(j). At the time of $T_1$ the timer circuit 14 produces at the output terminal 14f a "1" signal only for the predetermined time $T_2$ as shown in FIG. 2(f) and then as the timer circuit 15 applies a set pulse as shown in FIG. 2(g) to the set input terminal of the RSFF 12, the signal at the output terminal $\overline{Q}$ of the RSFF 12 changes to "0" as shown in FIG. 2(h) so that the gate circuit 3 is closed with a resultant rapid fall in the output voltage of the D-A converter 4, thereby causing the braking pressure control logic circuit 5 to produce a pressure reducing signal. When this happens, the transistor 8 is rendered conductive causing the signal at its collector to change from "1" to "0" as shown in FIG. 2(i), and this transition in turn resets the RSFF's 10b and 12 and sets the RSFF 13a so that the lamp 13b is lit and at the same time the RSFF 10b makes it ready for the next check cycle and the RSFF 12 returns the previously closed gate circuit 3 to its open condition. In this connection, the time interval that the output signal at the output terminal $\overline{Q}$ of the RSFF 12 assumes and remains in the "0" state (i.e., the duration time of the check signal) corresponds to the time interval between the instant at which the RSFF 12 is set by the output from the timer circuit 15 and the instant at which a "0" signal resulting from the subsequent conduction of the transistor 8 resets the RSFF 12 eventually. This time interval between the setting and the subsequent resetting of the RSFF 12 is preselected to be on the order of 3 milliseconds, for example, depending on the response speed of the electric circuitry ranging from the signal conversion circuit 4 to the electromagnetic coil 9 and this is sufficiently short as compared with the delay time of 15 milliseconds, for example, which is attended by the operation of the three-way valve and servo means of the braking pressure modulator, and therefore there is no possibility of the braking pressure modulator coming into operation during the time interval that the signal at the output terminal $\overline{Q}$ of the RSFF 12 remains in the "0" state. On the other hand, the lamp 13b will be energized and lit the instant the RSFF 13a is set by the "0" signal resulting from the conduction of the transistor 8 and it will be deenergized and turned off when the output of the M.M.V. 11 changes from "1" to "0" during the succeeding cycle. This lighting time is, as shown in FIG. 2(j), 47 milliseconds corresponding to the predetermined time duration, 50 milliseconds, of the signal produced at the output terminal 14f of the timer circuit 14 minus the time duration, 3 milliseconds, of the check signal.

Then, when the vehicle comes to a complete standstill, the output of the waveshaping circuit 2 will be changed to "0" so that the RSFF's 10b and 12 are placed in the reset condition and the RSFF 13a in the set condition, thereby causing the lamp 13b to be lit. Consequently, if the whole circuitry ranging from the pulse sensor 1 to the electromagnetic coil 9 as well as the logic circuit A are in normal condition, the lamp 13b will be lit when the vehicle is at rest, whereas it flashes repeatedly when the vehicle is being driven. On the contrary, if the lamp 13b fails to flash but remains to be on or continues to be off while the vehicle is being driven, this can be taken as an indication that there is a defect in some part of the electric circuitry ranging from the pulse sensor 1 to the electromagnetic coil 9 and the logic circuit A. On the other hand, while as previously described the whole circuitry should be in normal condition if the lamp 13b is on with the vehicle at rest, this cannot necessarily be true in all the instances.

For example, if any fault occurs such that the RSFF 13a produces a "1" signal at its output terminal Q, the lamp 13b will be lit thus giving an indication as if there is no defective part at all. In this case, however, the lamp 13b would continue to be on even after the vehicle is started, thereby indicating the presence of some defective part. Then, should any part of the circuitry ranging from the pulse sensor 1 to the electromagnetic coil 9 as well as any part of the logic circuit A become defective, the output signal of the M.M.V. 11, for example, will not change from "0" to "1" and vice versa so that the lamp 13b either continues to be on or maintains its off condition, thereby providing an indication of the defect.

While a specific embodiment of the present invention has been described, it is not intended to be limited to the illustrated embodiment, since various other embodiments can be devised by those skilled in the art. For example, the present invention can be equally embodied, in addition to the described anti-skid control system, in electrically operated automatic transmissions, fuel injection systems, direction indicator flashing systems and the like for purposes of checking defects therein. Furthermore, it may be arranged such that should any break or defect occur, a "1" or "0" signal continually produced at the output terminal Q of the RSFF 13a is first used to disconnect the ignition circuit of the vehicle engine from the power source so that an electromagnetic brake, parking brake or the like installed in addition to the main brake system may be actuated to automatically apply the braking pressure, thereby forcibly bringing the vehicle to a stop to facilitate a repair on the defective part.

What we claim is:

1. In a vehicle including an electrical circuit for receiving a signal from a signal source to produce a signal corresponding to a predetermined condition and electromagnetic means for receiving the signal from the electrical circuit to electromagnetically operate mechanical actuating means, a checking system for vehicle equipments comprising a logic circuit for applying a check signal to said electrical circuit to energize said electromagnetic means and for detecting the energization of said electromagnetic means to terminate said check signal, and means including a warning device operable upon receipt of said check signal from said logic circuit, wherein said check signal is obtained by modifying the waveshape of a signal from said signal source, and the duration time of said check signal is selected to be shorter than the delay time attended by the operation of said mechanical actuating means and said electromagnetic means.

2. In a vehicle including an electrical circuit for receiving a signal from a signal source to produce a signal corresponding to a predetermined condition and electromagnetic means for receiving the signal from the electrical circuit to electromagnetically operate mechanical actuating means, a checking system for vehicle equipments comprising a logic circuit for applying a check signal to said electrical circuit to energize said electromagnetic means and for detecting the energization of said electromagnetic means to terminate said check signal, and means including a warning device operable upon receipt of said check signal from said logic circuit, wherein said logic circuit comprises logic elements operable in accordance with a digital signal, said check signal is obtained by modifying the waveshape of a signal from said signal source, and the duration time of said check signal is selected to be shorter than the delay time attended by the operation of said mechanical actuating means and said electromagnetic means.

3. A checking system for vehicle equipment which includes a signal generator for representing an instant vehicle condition, an electrical control circuit for producing a signal corresponding to a predetermined vehicle condition, and electromagnetic means for operating mechanical actuating means comprising:

a gate circuit having an input terminal and connected between said signal generator and said electrical control circuit, for closing its gate upon receipt of a signal on its input terminal;

synchronized pulse generating means connected to said signal generator, for generating a pulse synchronized with the signal representing the vehical condition;

a flip-flop circuit having two input terminals, connected to said synchronized pulse generating means with a first terminal and to said electromagnetic means with a second terminal, and having an output terminal connected to the input terminal of said gate circuit to control said gate, said flip-flop circuit rendering said gate closed when the first terminal thereof receives the pulse synchronized with said signal representing the vehicle condition, said flip-flop circuit rendering said gate open when the second terminal thereof receives the signal from said electromagnetic means;

timer circuit means connected to said synchronized pulse generating means, for generating a delay signal corresponding to the synchronized pulse as an output;

a warning device including a flip-flop circuit having first and second input terminals which are connected to said electromagnetic means and to said timer circuit means, respectively, for indicating the operating condition of said vehicle equipment, said device further having an indicating lamp connected to said last flip-flop circuit to indicate the operating condition in response to the signals received on said first and second terminals of said last flip-flop circuit;

whereby said warning device indicates the operating condition without operating said mechanical actuating means.

4. The apparatus according to claim 3 wherein said gate circuit comprises a logic circuit requiring at least two inputs of the same type to gate same for producing an output.

5. A checking circuit for detecting the operability of a vehicle control circuit comprising:

a logic circuit for applying a check signal to the control circuit, means for detecting energization of the control circuit for controlling the logic circuit to terminate the check signal, and control means including a warning device for producing an indication when said check signals are received and subsequently terminated and producing another indication if said check signals persist or cease for longer than a selected interval, the check signal having a duration shorter than any time delay associated with complete actuation of the control circuit.

6. The apparatus of claim 5 further including generator means for producing an output indicative of an instantaneous vehicle condition; the control circuit producing signals corresponding to the vehicle condition in response to the generator means, and electromagnetic means for actuating a mechanical actuating means for the vehicle, the system further including:
   a gate circuit coupled to the signal generator and the control circuit for gating the signal generator output,
   synchronized pulse generating means coupled to the signal generator for generating a synchronizing signal corresponding with the vehicle condition signal, and
   means for operating the gate circuit gate closed to the signal generator output in synchronism with the synchron-ized pulse generating means so as to cause operation of the control circuit, said means operating the gate circuit open in response to the actuation of the control circuit, thereby producing an alternating output indication of a safe condition.

7. A checking device for detecting malfunction of a vehicle control circuit having
   a signal generator for generating an output signal representative of the instant value of a given changeable condition of a vehicle,
   an electrical circuit connected in circuit with said signal generator for generating a control signal when the change of the output signal satisfies a predetermined condition, and
   actuating means connected to receive said control signal and being fully actuated only after a predetermined time delay following receipt of the control signal,
   said checking device comprising:
   gate means connected in circuit between the signal generator and the electrical circuit for interrupting the transfer of the output signal from the signal generator to the electrical circuit thereby causing a said change of the output signal that satisfies the said predetermined condition in the electrical circuit,
   check signal generating means for generating a check signal,
   blocking means connected in circuit with said check signal generating means, said gate means, and said electrical circuit, for receiving the checking signal and then applying a blocking signal to said gate means to interrupt the output signal and subsequently terminating the blocking signal on receiving the control signal resulting from said interruption, the time duration of said resulting control signal being shorter than the said predetermined time delay for fully actuating said actuating means, and
   a warning device connected in circuit with said check signal generating means and said electrical circuit, for operating in response to the generation of the check signal and the control signal.

8. A checking device according to claim 7, wherein said check signal generating means includes a delay circuit for applying said check signal to said blocking means at a given tim ($T_1$) after said check signal is originated thereby to make a time interval ($T_1$) between application of said check signal to said blocking means and that to said warning device.

* * * * *